(12) United States Patent
He (10) Patent No.: US 11,455,773 B2
(45) Date of Patent: Sep. 27, 2022

(54) IMAGE PROCESSING METHOD AND DEVICE

(71) Applicants:Beijing Jingdong Shangke Information Technology Co., Ltd., Beijing (CN); Beijing Jingdong Century Trading Co., Ltd., Beijing (CN)

(72) Inventor: Jinping He, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 118 days.

(21) Appl. No.: 17/044,181

(22) PCT Filed: May 6, 2019

(86) PCT No.: PCT/CN2019/085599
§ 371 (c)(1),
(2) Date: Sep. 30, 2020

(87) PCT Pub. No.: WO2019/228144
PCT Pub. Date: Dec. 5, 2019

(65) Prior Publication Data
US 2021/0134056 A1 May 6, 2021

(30) Foreign Application Priority Data
May 31, 2018 (CN) .......................... 201810549444.9

(51) Int. Cl.
*G06T 17/10* (2006.01)
*G06T 7/80* (2017.01)
(Continued)

(52) U.S. Cl.
CPC ................ *G06T 17/10* (2013.01); *G06T 7/40* (2013.01); *G06T 7/529* (2017.01); *G06T 7/80* (2017.01); *G06T 2207/30124* (2013.01)

(58) Field of Classification Search
None
See application file for complete search history.

(56) References Cited

U.S. PATENT DOCUMENTS

2005/0088515 A1\* 4/2005 Geng ...................... G06T 7/564
348/47
2015/0287242 A1 10/2015 Kim et al.
(Continued)

FOREIGN PATENT DOCUMENTS

| CN | 104317999 A | 1/2015 |
| CN | 104933757 A | 9/2015 |

(Continued)

OTHER PUBLICATIONS

P. Huang, J. Yao and H. Zhao, "Automatic Realistic 3D Garment Generation Based on Two Images," 2016 International Conference on Virtual Reality and Visualization (ICVRV), 2016, pp. 250-257, doi: 10.1109/ICVRV.2016.48 (Year: 2016).*
(Continued)

*Primary Examiner* — James A Thompson
(74) *Attorney, Agent, or Firm* — Blank Rome LLP (57) ABSTRACT

Embodiments of the present disclosure provide a method and apparatus for processing an image. An embodiment of the method includes: acquiring a two-dimensional garment image, where the two-dimensional garment image includes a style identifier of a garment; selecting a three-dimensional garment model matching the style identifier from a pre-established set of three-dimensional garment models, wherein the three-dimensional garment model includes scatter points labeled thereon; labeling the two-dimensional garment image with scatter points based on a pre-established
(Continued)

coordinate mapping relationship between the two-dimensional garment image and the three-dimensional garment model and the scatter points of the selected three-dimensional garment model; generating a three-dimensional garment image of the acquired two-dimensional garment image based on the selected three-dimensional garment model and a result of the labeling.

18 Claims, 5 Drawing Sheets

(51) Int. Cl.
   *G06T 7/529* (2017.01)
   *G06T 7/40* (2017.01)

(56) References Cited

U.S. PATENT DOCUMENTS

2016/0379419 A1    12/2016  Khalili et al.
2018/0197331 A1*    7/2018  Chen ................... G06T 19/20
2019/0008226 A1*    1/2019  Krivonosova ........... A41H 3/04
2019/0043269 A1*    2/2019  Lin ............................ G06T 7/62
2019/0272679 A1*    9/2019  Brodsky ................. G06F 30/20

FOREIGN PATENT DOCUMENTS

CN    105354876 A    2/2016
CN    105913496 A    8/2016
CN    107067460 A    8/2017

OTHER PUBLICATIONS

International Search Report for PCT/CN2019/085599, dated Jul. 25, 2019, 3 pages.

* cited by examiner

IMAGE PROCESSING METHOD AND DEVICE

The present disclosure is a U.S. National Phase Application of International Application No. PCT/CN2019/085599 filed May 6, 2019, which claims priority to Chinese Patent Application No. "201810549444.9" filed on May 31, 2018, the entire contents of which are incorporated herein as a whole.

TECHNICAL FIELD

Embodiments of the present disclosure relate to the field of computer technology, and more particularly to a method and apparatus for processing an image.

BACKGROUND

Image processing is a technique for analyzing an image by using an image processing device to achieve a desired result. Generally, it performs processing methods such as image matching, image describing, and image recognizing on a color image, a grayscale image, and the like acquired by shooting by a photographing device, a scanning device, and the like to obtain processed images.

In a conventional method for processing a three-dimensional garment image, generally a texture of the garment image is processed by using a conventional image processing technology to obtain a three-dimensional garment image.

SUMMARY

Embodiments of the present disclosure provide a method and apparatus for processing an image.

In a first aspect, some embodiments of the present disclosure provide a method for processing an image, the method includes: acquiring a two-dimensional garment image, wherein the two-dimensional garment image includes a style identifier of a garment; selecting a three-dimensional garment model matching the style identifier from a pre-established set of three-dimensional garment models, wherein the three-dimensional garment model includes scatter points labeled thereon; labeling the two-dimensional garment image with scatter points based on a pre-established coordinate mapping relationship between the two-dimensional garment image and the three-dimensional garment model and the scatter points of the selected three-dimensional garment model; generating a three-dimensional garment image of the acquired two-dimensional garment image based on the selected three-dimensional garment model and a result of the labeling.

In some embodiments, the generating the three-dimensional garment image of the acquired two-dimensional garment image based on the selected three-dimensional garment model and the result of the labeling comprises: performing coordinate transformation on the scatter points of the acquired two-dimensional garment image, and determining coordinate information of the scatter points after the coordinate transformation; generating a primitive having a preset shape based on the coordinate information of the scatter points after the coordinate transformation, the primitive comprising a preset number of scatter points after the coordinate transformation and a connection relationship between the scatter points; rasterizing the primitive to obtain a fragment set of the primitive, wherein a fragment in the fragment set includes a color value and texture coordinate information; performing texture coordinate mapping on the fragment set to obtain pixels of the selected three-dimensional garment model; generating the three-dimensional garment image based on the obtained pixels.

In some embodiments, the fragment in the fragment set further comprise texture material information; and the generating the three-dimensional garment image based on the obtained pixels comprises: determining illumination information of the obtained pixels based on the texture material information and the preset light source coordinate information; processing the obtained pixels based on light source color information and the determined illumination information; generating the three-dimensional garment image based on the processed pixels.

In some embodiments, after the generating the three-dimensional garment image based on the obtained pixels, the method further comprises: smoothing texture of the three-dimensional garment image.

In some embodiments, the set of three-dimensional garment models is established by: acquiring a set of two-dimensional sample garment images, the set of two-dimensional sample garment images including two-dimensional sample garment image sequences of at least one style, for a two-dimensional sample garment image sequence of each style in the two-dimensional sample garment image sequences of at least one style, performing: extracting feature points of the two-dimensional sample garment image sequence; constructing a fundamental matrix based on the extracted feature points; establishing a three-dimensional garment model based on the constructed fundamental matrix and calibration parameters of a pre-calibrated camera, wherein the camera is a camera acquiring the two-dimensional sample garment image sequence; generating the set of three-dimensional garment models based on the established at least one three-dimensional garment model.

In some embodiments, after the generating the three-dimensional garment image of the acquired two-dimensional garment image, the method further comprises: receiving somatotype information; selecting a virtual three-dimensional model matching the somatotype information from a preset virtual three-dimensional model set; setting, based on a preset coordinate mapping relationship between the virtual three-dimensional model and the three-dimensional garment model, the three-dimensional garment image onto the selected virtual three-dimensional model and presenting.

In a second aspect, some embodiments of the present disclosure provide an apparatus for processing an image, the apparatus includes: an acquisition unit, configured to acquire a two-dimensional garment image, wherein the two-dimensional garment image includes a style identifier of a garment; a selection unit, configured to select a three-dimensional garment model matching the style identifier from a pre-established set of three-dimensional garment models, wherein the three-dimensional garment model includes scatter points labeled thereon; a labeling unit, configured to label the two-dimensional garment image with scatter points based on a pre-established coordinate mapping relationship between the two-dimensional garment image and the three-dimensional garment model and the scatter points of the selected three-dimensional garment model; a generation unit, configured to generate a three-dimensional garment image of the acquired two-dimensional garment image based on the selected three-dimensional garment model and a result of the labeling.

In some embodiments, the generation unit comprises: a coordinate transformation subunit, configured to perform coordinate transformation on the scatter points of the acquired two-dimensional garment image, and determining coordinate information of the scatter points after the coordinate transformation; a primitive generation subunit, configured to generate a primitive having a preset shape based on the coordinate information of the scatter points after the coordinate transformation, the primitive comprising a preset number of scatter points after the coordinate transformation and a connection relationship between the scatter points; a processing subunit, configured to rasterize the primitive to obtain a fragment set of the primitive, wherein a fragment in the fragment set includes a color value and texture coordinate information; a texture coordinate mapping subunit, configured to perform texture coordinate mapping on the fragment set to obtain pixels of the selected three-dimensional garment model; a generation subunit, configured to generate the three-dimensional garment image based on the obtained pixels.

In some embodiments, the fragment in the fragment set further comprise texture material information; and the generation subunit is further configured to: determine illumination information of the obtained pixels based on the texture material information and the preset light source coordinate information; process the obtained pixels based on light source color information and the determined illumination information; generate the three-dimensional garment image based on the processed pixels.

In some embodiments, the apparatus for processing an image is further configured to: smooth texture of the three-dimensional garment image.

In some embodiments, the set of three-dimensional garment models is established by: acquire a set of two-dimensional sample garment images, the set of two-dimensional sample garment images including two-dimensional sample garment image sequences of at least one style, for a two-dimensional sample garment image sequence of each style in the two-dimensional sample garment image sequences of at least one style, perform: extracting feature points of the two-dimensional sample garment image sequence; constructing a fundamental matrix based on the extracted feature points; establishing a three-dimensional garment model based on the constructed fundamental matrix and calibration parameters of a pre-calibrated camera, wherein the camera is a camera acquiring the two-dimensional sample garment image sequence; generate the set of three-dimensional garment models based on the established at least one three-dimensional garment model.

In some embodiments, the apparatus for processing an image is further configured to: receive somatotype information; select a virtual three-dimensional model matching the somatotype information from a preset virtual three-dimensional model set; set, based on a preset coordinate mapping relationship between the virtual three-dimensional model and the three-dimensional garment model, the three-dimensional garment image onto the selected virtual three-dimensional model and presenting.

In a third aspect, some embodiments of the present disclosure provide a server, the server includes: one or more processors; a storage apparatus, storing one or more programs thereon, where the one or more programs, when executed by the one or more processors, cause the one or more processors to implement the method according to any one of the embodiments in the first aspect.

In a fourth aspect, some embodiments of the present disclosure provide a computer readable storage medium, storing a computer program thereon, wherein the program, when executed by a processor, implements the method according to any one of the embodiments in the first aspect.

The method and apparatus for processing an image according to embodiments of the present disclosure, by acquiring a two-dimensional garment image, selecting a three-dimensional garment model matching the style identifier from a pre-established set of three-dimensional garment models, labeling the two-dimensional garment image with scatter points based on a pre-established coordinate mapping relationship between the two-dimensional garment image and the three-dimensional garment model and the scatter points of the selected three-dimensional garment model, and generating a three-dimensional garment image of the acquired two-dimensional garment image based on the selected three-dimensional garment model and a result of the labeling, thereby the speed of generating the three-dimensional garment image is increased and the accuracy of the generated three-dimensional garment image is improved.

BRIEF DESCRIPTION OF THE DRAWINGS

Other features, objectives and advantages of the present disclosure will become more apparent upon reading the detailed description to non-limiting embodiments with reference to the accompanying drawings.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
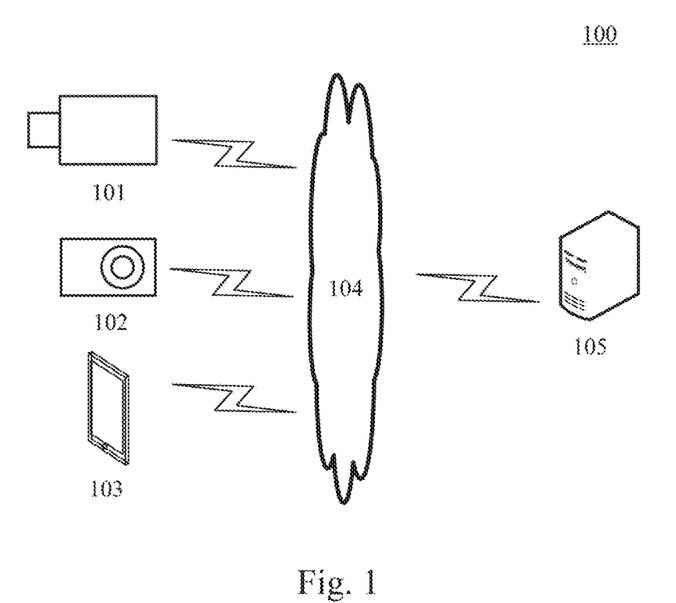
FIG. 1 is a diagram of an example system architecture in which embodiments of the present disclosure may be implemented.

FIG. 1 shows an example system architecture 100 in which a method for processing an image or an apparatus for processing an image according to embodiments of the present disclosure may be applied.

As shown in FIG. 1, the system architecture 100 may include a terminal device 101, 102 or 103, a network 104, and a server 105. The network 104 serves as a medium providing a communication link between the terminal device 101, 102 or 103, and the server 105. The network 104 may include various types of connections, such as wired or wireless communication links, or optical cables.

A user may use the terminal device 101, 102 or 103 to interact with the server 105 through the network 104, in order to transmit or receive messages, etc.

The terminal devices 101, 102, and 103 may be hardware or software. When the terminal devices 101, 102, and 103 are hardware, they may be various electronic devices that support image capturing function, including but not limited to camera, camcorders, webcam, smart phones, tablet computers, and so on. When the terminal devices 101, 102 and 103 are software, they may be installed in the electronic devices listed above. It may be implemented as multiple software or software module, or as a single software or software module. This is not specifically limited here.

The server 105 may be a server that provides various services, for example, the server 105 may analyze and process the data such as a two-dimensional garment image acquired by the terminal device 101, 102, or 103, and generating a processing result (for example, a three-dimensional garment image).

It should be noted that the server 105 may be hardware, or may be software. When the server 105 is hardware, the server may be implemented as a distributed server cluster composed of a plurality of servers, or may be implemented as a single server. When the server 105 is software, the server may be implemented as a plurality of software programs or software modules (e.g., software programs or software modules for providing distributed services), or may be implemented as a single software program or software module. This is not specifically limited herein.

It should be noted that the above terminal device has specific image processing function, and may process the acquired two-dimensional garment image and generate a three-dimensional garment image through the image processing function. In this case a server 105 is not necessary to be provided, and accordingly, the apparatus for processing an image may be provided in the terminal devices 101, 102, and 103. When the server 105 stores the two-dimensional garment images, the terminal devices 101, 102 and 103 may not necessary to be provided, and the method for processing an image provided by embodiments of the present disclosure may be executed by the server 105, and accordingly the apparatus for processing an image may be provided in the server 105.

It should be understood that the numbers of vehicles, networks, and servers in FIG. 1 are merely illustrative. Any number of vehicles, networks, and servers may be provided based on actual requirements.

Figure 2:
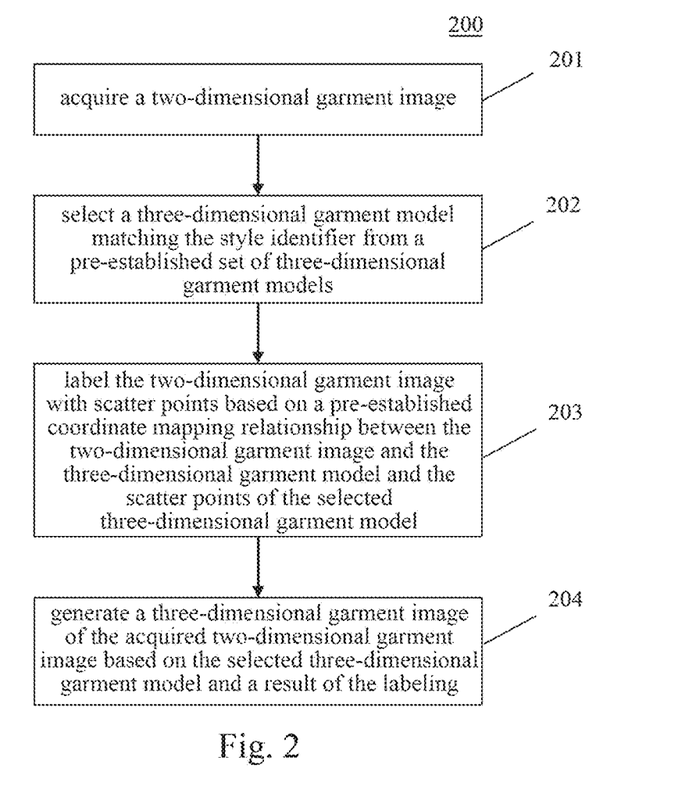
FIG. 2 is a flowchart of a method for processing an image according to an embodiment of the present disclosure.

With continued reference to FIG. 2, a flow 200 of a method for processing an image according to an embodiment of the present disclosure is shown. The method for processing an image includes the steps of:

Step 201, acquiring a two-dimensional garment image.

In the present embodiment, the execution body of the method for processing an image (for example, the server 105 shown in FIG. 1) may acquire a two-dimensional garment image from a terminal device (for example, the terminal devices 101, 102, or 103 shown in FIG. 1) through a wired connection or a wireless connection. The terminal device includes, but is not limited to, a camera, a camcorders, a webcam, a smartphone, a tablet computer, and the like. Here, the two-dimensional garment image may be acquired locally by the execution body. The two-dimensional garment image may include a coat garment image, a pants garment image, a T-shirt garment image, and the like. In general, garments may include various categories, such as jeans, sports pants, wind-breaker, down clothes, and the like, and garments of the same category may include various different styles, and garments of the same style may include different colors, patterns, and the like. Here, garments of the same style and different colors may be provided with the same style identifier in advance. When acquiring the two-dimensional garment image, the execution body may further acquire the style identifier of the garment presented by the two-dimensional garment image. The style identifier may include text for describing a garment style, and may also include numbers, letters, strings, and the like.

At step 202, selecting a three-dimensional garment model matching the style identifier from a pre-established set of three-dimensional garment models.

In the present embodiment, the above execution body may pre-establish a set of three-dimensional garment models. The set of three-dimensional garment models may be provided with three-dimensional garment models of different styles. A three-dimensional garment model may be created based on the style features of garments of a certain style. Here, the three-dimensional garment model is a mesh three-dimensional garment model created based on a three-dimensional reconstruction technique. Thus, garments of the same style but of different textures may be characterized by the same three-dimensional garment model. Texture generally refers to the color on an object and may also refer to the surface roughness of the object, and it is typically represented by color values. Each three-dimensional garment model may be provided with a style identifier. With the style identifier, the above-described execution body may select, from the set of three-dimensional garment models, a three-dimensional garment model matching the garment presented by the acquired two-dimensional garment image. Here, the style identifier may include text for describing a garment style, and may also include numbers, letters, character strings, or the like, which may be represented in the same manner as the style identifier included in the two-dimensional garment image. Thus, the above-described execution body may select a three-dimensional garment model having the same style as the garment presented by the acquired two-dimensional garment image from the pre-established set of three-dimensional garment models. A three-dimensional garment model in the set of three-dimensional garment models described above may also include labeled scatter points. Here, the scatter points may be points manually labeled on the three-dimensional garment model, or may be points pre-generated by the above-mentioned execution body. By labeling scatter points on the three-dimensional garment model, the speed at which the garment image texture is mapped onto the three-dimensional garment model may be increased. The scatter point information of a scatter point may include, for example, object coordinate information or the like. The object coordinates are generally coordinates with the center of the object as the coordinate origin. The set of three-dimensional garment models described above may be created based on different styles of garments to be created by using existing three-dimensional model creation techniques, such as Autodesk Maya model creation software.

In some alternative implementations of the present embodiment, the set of three-dimensional garment models described above may also be established by:

First, the execution body may acquire a set of two-dimensional sample garment images. Here, the set of two-dimensional sample images includes two-dimensional sample garment image sequences of at least one style. Here, the two-dimensional sample garment image sequence may include a front-side two-dimensional sample garment image of the sample garment, a reverse-side two-dimensional sample garment image of the sample garment, and the like.

Then, for a two-dimensional sample garment image sequence of each style in the two-dimensional sample garment image sequences of at least one style, the execution body may perform the step of: first extracting feature points of the two-dimensional sample garment image sequence. Here, a feature point may be a point in the image where the brightness changes drastically or a point with a maximum curvature on the edge curve of the image, the feature point has a significant difference from the surrounding adjacent points. The feature point extraction method may be performed using an existing SIFT (Scale-invariant feature transform) algorithm. Next, constructing a fundamental matrix based on the extracted feature points using a linear method. Then determining a projection matrix based on the camera based on pre-calibrated camera calibration parameters. So that the three-dimensional garment model is obtained by the constructed fundamental matrix and the projection matrix of the camera. Here, the pre-calibrated camera is a camera that acquires the two-dimensional sample garment image sequence. The camera has been calibrated when the two-dimensional sample garment image sequence is acquired.

Finally, the set of three-dimensional garment models are generated by establishing at least one three-dimensional garment model.

Step 203: labeling the two-dimensional garment image with scatter points based on a pre-established coordinate mapping relationship between the two-dimensional garment image and the three-dimensional garment model and the scatter points of the selected three-dimensional garment model.

In the present embodiment, the above-described execution body may pre-establish the coordinate mapping relationship between the two-dimensional garment image and the three-dimensional garment model. As an example, the coordinate mapping relationship may be established by: first performing texture segmentation on the three-dimensional garment model using existing surface texture segmentation techniques. The three-dimensional garment model is a three-dimensional model which is mesh like and labeled with scatter points and texture hasn't been mapped thereon. Therefore, after texture segmentation is performed on the three-dimensional garment model, the obtained texture plane map of the three-dimensional garment model is a scatter point map. Next, establishing a mapping relationship between the obtained scatter point map and the three-dimensional garment model. This mapping relationship is the coordinate mapping relationship between the two-dimensional garment image and the three-dimensional garment model.

In the present embodiment, the above-described execution body may label the acquired two-dimensional garment image with scatter points based on the pre-established coordinate mapping relationship between the two-dimensional garment image and the three-dimensional garment model. As an example, based on the coordinate information of the scatter points on the scatter point map of the selected three-dimensional garment model, the coordinate information being in the two-dimensional plane, the above-described execution body may label the acquired two-dimensional garment image at the positions corresponding thereto.

Step 204: generating a three-dimensional garment image of the acquired two-dimensional garment image based on the selected three-dimensional garment model and a result of the labeling.

In the present embodiment, based on the labeling result of the two-dimensional garment image in step 203, the above-described execution body may determine the color values, gray values, and the like at the scatter points on the labeled two-dimensional garment image. The color values and the gray values are set, through the pre-established coordinate mapping relationship between the two-dimensional garment image and the three-dimensional garment model, at corresponding labeled scatter points on the selected three-dimensional garment model. And the color values, gray values between the scatter points are obtained by interpolating the scatter points by using an existing interpolation algorithm technology. Thus, a three-dimensional garment image of the acquired two-dimensional garment image is generated based on the color values and the gray values at the points on the acquired three-dimensional garment model.

Figure 3:
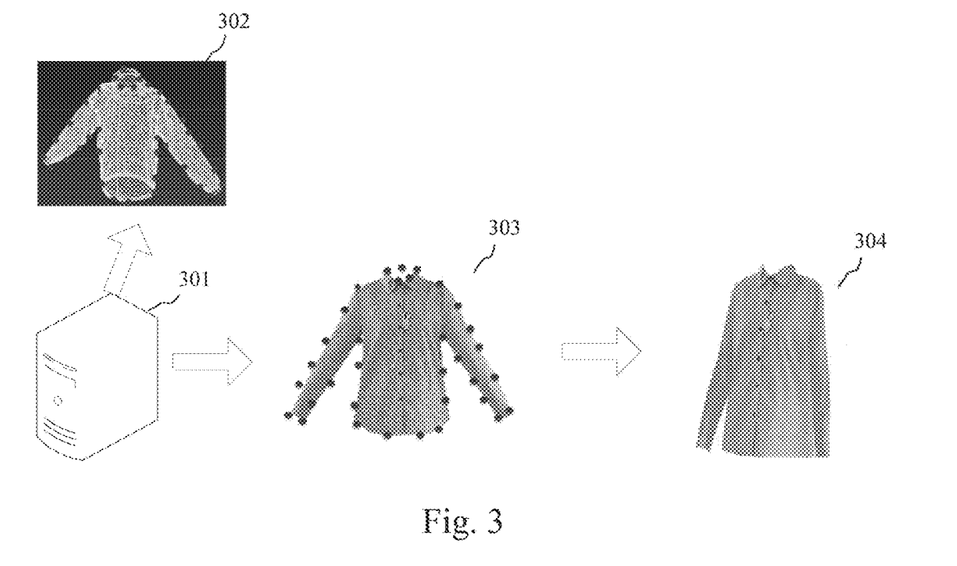
FIG. 3 is an application scenario of the method for processing an image according to an embodiment of the present disclosure.

With continued reference to FIG. 3, FIG. 3 is a schematic diagram of an application scene of the method for processing an image according to the present embodiment. In the application scenario of FIG. 3, after the server 301 acquires the two-dimensional garment image with the style identifier "shirt", a three-dimensional garment model 302 matching the "shirt" may be selected from the pre-established set of three-dimensional garment models Here, the three-dimensional garment model 302 is a mesh three-dimensional model with no texture map added thereon. The three-dimensional garment model also includes labeled scatter points. Then, the server 301 may label the acquired two-dimensional garment image with scatter points according to the coordinate mapping relationship between the pre-established three-dimensional garment model 302 and the acquired two-dimensional garment image and the scatter points of the three-dimensional garment model 302. Reference numeral 303 is the two-dimensional garment image of the "shirt" that has been labeled with scatter points. Finally, the three-dimensional garment image 304 of the acquired two-dimensional garment image is generated based on the result of labeling scatter points on the two-dimensional garment image of the "shirt" and the three-dimensional garment model 302.

According to the method and apparatus for processing an image provided in embodiments of the present invention, by acquiring a two-dimensional garment image, selecting a three-dimensional garment model matching the style identifier from a pre-established set of three-dimensional garment models, then labeling the two-dimensional garment image with scatter points based on a pre-established coordinate mapping relationship between the two-dimensional garment image and the three-dimensional garment model and the scatter points of the selected three-dimensional garment model, and finally generating a three-dimensional garment image of the acquired two-dimensional garment image based on the selected three-dimensional garment model and a result of the labeling thereby the speed of generating the three-dimensional garment image is increased and the accuracy of the generated three-dimensional garment image is improved.

Figure 4:
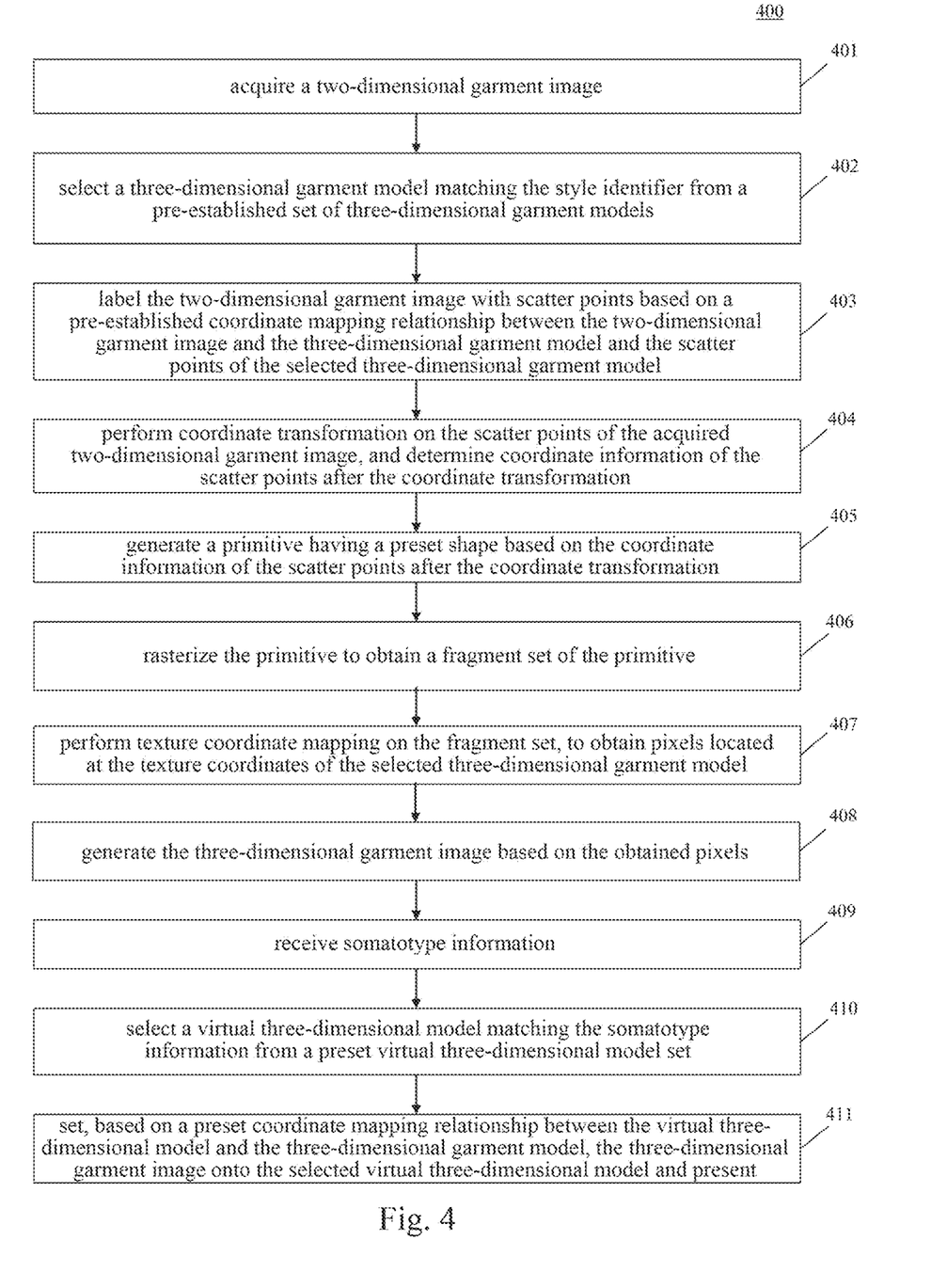
FIG. 4 is a flowchart of a method for processing an image according to another embodiment of the present disclosure.

With continued reference to FIG. 4, a flow 400 of a method for processing an image according to another embodiment of the present disclosure is shown. The method for processing an image includes the steps of:

Step 401: acquiring a two-dimensional garment image.

In the present embodiment, the execution body of the method for processing an image (for example, the server 105 shown in FIG. 1) may acquire a two-dimensional garment image from a terminal device (for example, the terminal devices 101, 102, 103 shown in FIG. 1) through a wired connection or a wireless connection. Here, the two-dimensional garment image may be acquired locally by the execution body. The two-dimensional garment image may include a coat garment image, a pants garment image, a T-shirt garment image, and the like. Here, garments of the same style and different colors may be provided with the same style identifier in advance. When acquiring the two-dimensional garment image, the execution body may further acquire the style identifier of the garment presented by the two-dimensional garment image. The style identifier may include text for describing a clothing style, and may also include numbers, letters, strings, and the like.

In step 402, selecting a three-dimensional garment model matching the style identifier from a pre-established set of three-dimensional garment models.

In the present embodiment, the above-described execution body may pre-establish a set of three-dimensional garment models. The set of three-dimensional garment models may be provided with three-dimensional garment models of different styles. Here, the three-dimensional garment model is a mesh three-dimensional garment model created based on a three-dimensional reconstruction technique. Thus, garments of the same style but of different textures may be characterized by the same three-dimensional garment model. Each three-dimensional garment model may be provided with a style identifier. With the style identifier, the above-mentioned execution body may select, from the set of three-dimensional garment models, a three-dimensional garment model matching the garment presented by the acquired garment image. Here, the style identifier includes a text for describing a garment style, and may also include a number, a letter, a character string, or the like, which may be represented in the same manner as the style identifier included in the two-dimensional garment image. The three-dimensional garment model in the set of three-dimensional garment models described above may also include labeled scatter points. Here, the scatter point information of a scatter point may include, for example, object coordinate information or the like. The object coordinates are generally coordinates with the center of the object as the coordinate origin.

Step 403: labeling the two-dimensional garment image with scatter points based on a pre-established coordinate mapping relationship between the two-dimensional garment image and the three-dimensional garment model and the scatter points of the selected three-dimensional garment model.

In the present embodiment, the above-described execution body may pre-establish the coordinate mapping relationship between the two-dimensional garment image and the three-dimensional garment model. According to the pre-established coordinate mapping relationship between the two-dimensional garment image and the three-dimensional garment model, the above-described execution body may label the acquired two-dimensional garment image with scatter points. Here, the information of the scatter points of the labeled two-dimensional garment image may include object coordinate information, texture information, and the like. Here, the object coordinate information of the scatter points of the two-dimensional garment image is the physical coordinate information of the labeled scatter points of the selected three-dimensional garment model. Texture generally refers to the color on an object and may also refer to the surface roughness of the object. It is typically represented by color values. Each color value is referred to as a texture element or texture pixel. Typically, each texture pixel has a unique address in the texture. The address may be considered to be the value of a column and a row, represented by U and V, respectively. The texture coordinate is the coordinate in an object system obtained by mapping the address of the texture pixel to the object coordinate system. Texture processing may be performed on an object model based on the texture coordinate information. The texture information may include texture coordinate information, texture color information, and the like. Here, the texture information of the scatter points of the two-dimensional garment image may include texture element information and texture coordinate information of the scatter points mapped to the selected three-dimensional garment model.

Step 404: performing coordinate transformation on the scatter points of the acquired two-dimensional garment image, and determining coordinate information of the scatter points after the coordinate transformation.

Based on the labeling result of the scatter points of the two-dimensional garment image obtained in step 403, the above-mentioned execution body may perform coordinate transformation on the acquired scatter points of the two-dimensional garment image. Here, the coordinate transformation may include, for example, mapping the scatter points from the object coordinate system to the world coordinate system to obtain coordinates of the scatter points in the world coordinate system. Next, the scatter points are converted from the world coordinate system to the screen coordinate system so that the three-dimensional garment model may be displayed on the screen. Here, the above coordinate transformation may further include mapping the texture coordinates of the scatter points to screen coordinates. Thus, the coordinate information of the scatter points after the coordinate transformation is determined according to the coordinate transformation. It should be noted here that the above-mentioned methods of coordinate transformation are known in the art, and details are not described herein.

Step 405: generating a primitive having a preset shape based on the coordinate information of the scatter points after the coordinate transformation.

In the present embodiment, based on the coordinate information of the scatter points after the coordinate transformation determined in step 404, the above-described execution body may use the scatter points after the coordinate transformation as vertices, and connect a predetermined number of adjacent scatter points to form a primitive of a preset shape. Here, the preset shape may include, for example, a triangle, a quadrangle, a polygon, or the like. Here, primitives of one preset shape may be generated, or primitives of a plurality of preset shapes may be generated. Each primitive also includes connection relationships between the scatter points after the coordinate transformation. The connection relationship includes, for example, the number of other scatter points connected to each scatter point, relative coordinate information between the other scatter points connected to each scatter point and the each scatter point, and the like.

Step 406: rasterizing the primitive to obtain a fragment set of the primitive.

In the present embodiment, for a primitive determined in step 405, the execution body may rasterize the primitive to obtain a fragment set of primitive. Here, the rasterization generally includes interpolating between scatter points in the primitive to obtain a plurality of interpolated points and interpolated point information. Each obtained interpolated point as well as the interpolated point information may be referred to as a fragment. Here, the interpolation point information may include, for example, color information, texture coordinate information, and the like.

Step 407: performing texture coordinate mapping on the fragment set, to obtain pixels located at the texture coordinates of the selected three-dimensional garment model.

In the present embodiment, based on the fragment set determined in step 406, the above-mentioned execution body may determine the color values at the points on the three-dimensional garment model based on the texture coordinate information and the color information of each fragment. Thus, the above-described execution body may perform shading processing on the selected three-dimensional garment model, thereby obtaining pixels at the points on the three-dimensional garment model. Here, the points on the three-dimensional garment model include both the labeled scatter points and the interpolated points obtained by the interpolation.

Step 408: generating the three-dimensional garment image based on the obtained pixels.

In the present embodiment, the above-mentioned execution body may render the three-dimensional garment model based on the pixels of the points on the three-dimensional garment model determined in step 407, thereby generating the three-dimensional garment image having the texture of the acquired two-dimensional garment image.

In some alternative implementations of the present embodiment, the fragment in the fragment set may also include texture material information. Since the texture material of the garment presented by the two-dimensional garment image is rough material, ambient light (e.g., sunlight) projected onto the surface of the garment would produce diffuse reflection. The execution body may also determine the texture material coefficient based on the texture material information of the fragments in the fragment set, and then the execution body may simulate the diffuse reflection light intensity of the ambient light at the pixels on the three-dimensional garment model when the environment light is irradiated on the three-dimensional garment model. Here, the diffuse reflection light intensity of the ambient light is generally the product of the texture material coefficient and the ambient light intensity. The execution body may further determine the relative positions of the virtual light source and pixel points on the three-dimensional garment model, based on the coordinate of the virtual light source in the screen coordinate system with the virtual light source being provided in the three-dimensional scene. Therefore, the above-mentioned execution body may determine the diffuse reflection light intensity of directional light at each pixel based on the Lambert illumination model. In the Lambert illumination model, it is pointed out that the light intensity of the diffuse reflection light is only proportional to the cosine of the included angle between the direction of the incident light and the surface normal vector at the reflection point. Therefore, based on the intensity of the light source, the included angle between the light source and the normal vector at a pixel point, and the reflection coefficient of the texture material at the pixel point, the diffuse reflection light intensity of the directional light at the pixel point may be obtained. Finally, the sum of the diffuse reflected light intensity of the ambient light at the pixel and the diffuse reflection light intensity of the directional light at the pixel is determined as the illumination intensity information of the pixel. The execution body processes the obtained color values of the pixels based on the obtained illumination intensity information of the pixel points and based on the color information of the light source. Here, the processing method may include changing the color values of the pixel points of the three-dimensional garment model when no light source is added thereon. The method for processing a color value may include, for example, performing a product calculation, according to weight values, on the color value of the color of the light source, the illumination intensity value, and the color value of the pixel on the three-dimensional garment model when the light source has not been added thereon, and determining a calculation result as the color value at the pixel. And finally, the execution body may generate the three-dimensional garment image based on the processed pixels.

In some alternative implementations of the present embodiment, the above-described execution body may also smooth the texture of the three-dimensional garment image.

Step 409, receiving somatotype information.

In the present embodiment, the above-described execution body may also receive somatotype information. Here, the somatotype information may be size information of various parts of the body, such as waist circumference information, shoulder width information, chest circumference information, or the like, transmitted by the user through a terminal. The somatotype information may also be body ratio information or the like selected by the user through a terminal.

Step 410, selecting a virtual three-dimensional model matching the somatotype information from a preset virtual three-dimensional model set.

In the present embodiment, based on the somatotype information received in step 409, the execution body may compare the size data in the somatotype information with the body size data of the preset virtual three-dimensional models in the preset virtual three-dimensional model set, and select, based on the comparison result, a preset virtual three-dimensional model in which the size data is smaller than a preset threshold value as the virtual three-dimensional model matching the shape information.

Step 411, setting, based on a preset coordinate mapping relationship between the virtual three-dimensional model and the three-dimensional garment model, the three-dimensional garment image onto the selected virtual three-dimensional model and presenting.

In the present embodiment, according to the virtual three-dimensional model selected in step 410, the above-mentioned execution body may set the three-dimensional garment image onto the selected virtual three-dimensional model according to the coordinate mapping relationship between the preset virtual three-dimensional model and the three-dimensional garment model. Here, the pre-established coordinate mapping relationship between the virtual three-dimensional model and the three-dimensional garment model may be a coordinate mapping relationship between the virtual three-dimensional model and the three-dimensional garment model in the screen coordinate system. Thus, the points on the three-dimensional garment image is mapped onto the preset virtual three-dimensional model, and the three-dimensional garment image is presented through the three-dimensional virtual model.

As can be seen from FIG. 4, different from the embodiment shown in FIG. 2, the process of generating the three-dimensional garment image is discussed in more detail in the present embodiment, so that the texture of the acquired two-dimensional garment image may be more accurately set onto the selected three-dimensional model; Meanwhile, in the present embodiment, the three-dimensional garment image is presented by using the preset virtual three-dimensional model, so that the user may more intuitively view the generated three-dimensional garment image, thereby improving the visualization effect.

Figure 5:
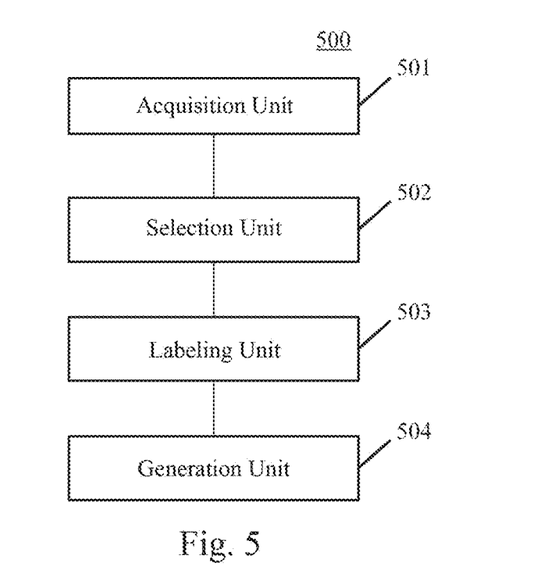
FIG. 5 is a schematic structural diagram of an apparatus for processing an image according to an embodiment of the present disclosure.

Further referring to FIG. 5, as an implementation of the method shown in the above figures, an embodiment of the present disclosure provides an apparatus for processing an image. The embodiment of the apparatus corresponds to the embodiment of the method shown in FIG. 2. The apparatus may be specifically applied to various electronic devices.

As shown in FIG. 5, the apparatus 500 for processing information of the present embodiment includes: an acquisition unit 501, a selection unit 502, a labeling unit 503, a generation unit 504. The acquisition unit is configured to acquire a two-dimensional garment image, wherein the two-dimensional garment image includes a style identifier of a garment. The selection unit is configured to select a three-dimensional garment model matching the style identifier from a pre-established set of three-dimensional garment models, wherein the three-dimensional garment model includes scatter points labeled thereon. The labeling unit is configured to label the two-dimensional garment image with scatter points based on a pre-established coordinate mapping relationship between the two-dimensional garment image and the three-dimensional garment model and the scatter points of the selected three-dimensional garment model. The generation unit is configured to generate a three-dimensional garment image of the acquired two-dimensional garment image based on the selected three-dimensional garment model and a result of the labeling.

In the present embodiment, in the apparatus 500 for processing an image, the specific processing of the acquisition unit 501, the selection unit 502, the labeling unit 503, and the generation unit 504 and the technical effects thereof may refer to the related description of step 201, step 202, step 203, and step 204, in the corresponding embodiment of FIG. 2, respectively. The description will not be repeated here.

In some alternative implementations of the present embodiment, the generation unit 504 further includes a coordinate transformation subunit (not shown), configured to perform coordinate transformation on the scatter points of the acquired two-dimensional garment image, and determining coordinate information of the scatter points after the coordinate transformation. A primitive generation subunit (not shown), configured to generate a primitive having a preset shape based on the coordinate information of the scatter points after the coordinate transformation, the primitive comprising a preset number of scatter points after the coordinate transformation and a connection relationship between the scatter points. A processing subunit (not shown), configured to rasterize the primitive to obtain a fragment set of the primitive, wherein a fragment in the fragment set includes a color value and texture coordinate information. A texture coordinate mapping subunit (not shown), configured to perform texture coordinate mapping on the fragment set to obtain pixels of the selected three-dimensional garment model. A generation subunit (not shown), configured to generate the three-dimensional garment image based on the obtained pixels.

In some alternative implementations of the present embodiment, the fragment in the fragment set further comprise texture material information; and the generation subunit (not shown) is further configured to: determine illumination information of the obtained pixels based on the texture material information and the preset light source coordinate information; process the obtained pixels based on light source color information and the determined illumination information; generate the three-dimensional garment image based on the processed pixels.

In some alternative implementations of the present embodiment, the apparatus for processing an image is further configured to: smooth texture of the three-dimensional garment image.

In some alternative implementations of the present embodiment, the set of three-dimensional garment models is established by: acquire a set of two-dimensional sample garment images, the set of two-dimensional sample garment images including two-dimensional sample garment image sequences of at least one style, for a two-dimensional sample garment image sequence of each style in the two-dimensional sample garment image sequences of at least one style, perform: extracting feature points of the two-dimensional sample garment image sequence; constructing a fundamental matrix based on the extracted feature points; establishing a three-dimensional garment model based on the constructed fundamental matrix and calibration parameters of a pre-calibrated camera, wherein the camera is a camera acquiring the two-dimensional sample garment image sequence; generate the set of three-dimensional garment models based on the established at least one three-dimensional garment model.

In some alternative implementations of the present embodiment, the apparatus for processing an image is further configured to: receive somatotype information; select a virtual three-dimensional model matching the somatotype information from a preset virtual three-dimensional model set; set, based on a preset coordinate mapping relationship between the virtual three-dimensional model and the three-dimensional garment model, the three-dimensional garment image onto the selected virtual three-dimensional model and presenting.

Figure 6:
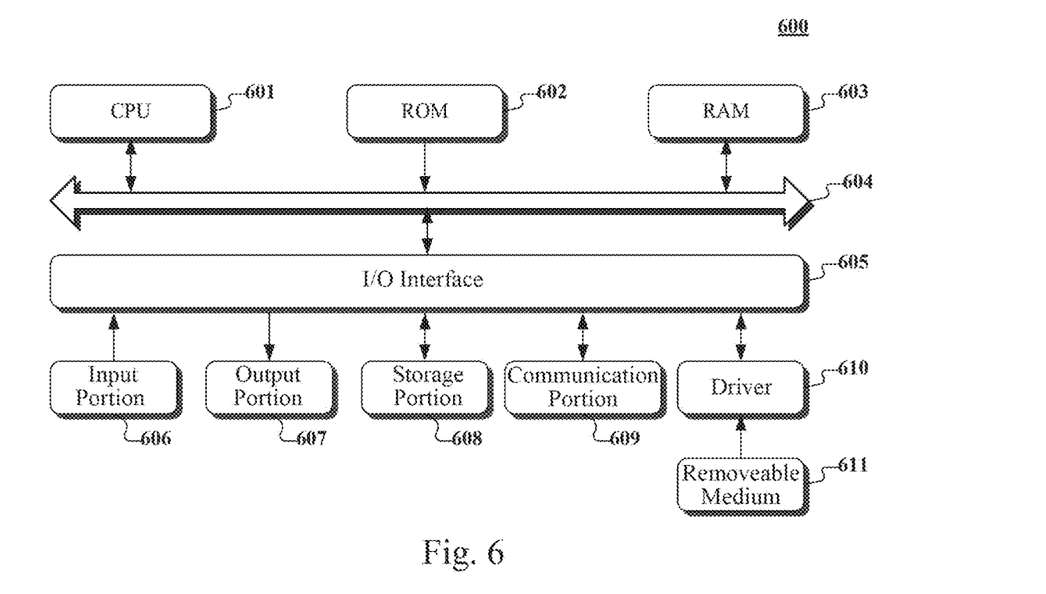
FIG. 6 is a schematic structural diagram of a computer system of a server adapted to implement embodiments of the present disclosure.

Referring to FIG. 6, a schematic structural diagram of a computer system 600 adapted to implement a terminal device or a server of the embodiments of the present disclosure is shown. The electronic device shown in FIG. 6 is just an example, and should bring no limitation to the function and usage range of embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the removeable medium 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that may be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure may be implemented by means of software or hardware. The described units or modules may also be provided in a processor, for example, described as: a processor, comprising an acquis ion unit, a selection unit, a labeling unit, and a generation unit, where the names of these units or modules do not in some cases constitute a limitation to such units or modules themselves. For example, the acquis ion unit may also be described as "a unit for acquiring a two-dimensional garment image."

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a two-dimensional garment image, wherein the two-dimensional garment image includes a style identifier of a garment; select a three-dimensional garment model matching the style identifier from a pre-established set of three-dimensional garment models, wherein the three-dimensional garment model includes scatter points labeled thereon; label the two-dimensional garment image with scatter points based on a pre-established coordinate mapping relationship between the two-dimensional garment image and the three-dimensional garment model and the scatter points of the selected three-dimensional garment model; generate a three-dimensional garment image of the acquired two-dimensional garment image based on the selected three-dimensional garment model and a result of the labeling.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for processing an image, comprising:
   acquiring a two-dimensional garment image, wherein the two-dimensional garment image includes a style identifier of a garment;
   selecting a three-dimensional garment model matching the style identifier from a pre-established set of three-dimensional garment models, wherein the three-dimensional garment model includes scatter points labeled thereon;

labeling the two-dimensional garment image with scatter points based on a pre-established coordinate mapping relationship between the two-dimensional garment image and the three-dimensional garment model and the scatter points of the selected three-dimensional garment model;

performing coordinate transformation on the scatter points of the acquired two-dimensional garment image, and determining coordinate information of the scatter points after the coordinate transformation;

generating a primitive having a preset shape based on the coordinate information of the scatter points after the coordinate transformation, the primitive comprising a preset number of scatter points after the coordinate transformation and a connection relationship between the scatter points;

rasterizing the primitive to obtain a fragment set of the primitive, wherein a fragment in the fragment set includes a color value and texture coordinate information;

performing texture coordinate mapping on the fragment set to obtain pixels of the selected three-dimensional garment model; and generating the three-dimensional garment image based on the obtained pixels.

2. The method according to claim 1, wherein
the connection relationship comprises a number of other scatter points connected to each scatter point, and relative coordinate information between the other scatter points connected to each scatter point and the each scatter point.

3. The method according to claim 2, wherein the fragment in the fragment set further comprise texture material information; and
the generating the three-dimensional garment image based on the obtained pixels comprises:
determining illumination information of the obtained pixels based on the texture material information and the preset light source coordinate information;
processing the obtained pixels based on light source color information and the determined illumination information;
generating the three-dimensional garment image based on the processed pixels.

4. The method according to claim 2, wherein after the generating the three-dimensional garment image based on the obtained pixels, the method further comprises:
smoothing texture of the three-dimensional garment image.

5. The method according to claim 1, wherein the set of three-dimensional garment models is established by:
acquiring a set of two-dimensional sample garment images, the set of two-dimensional sample garment images including two-dimensional sample garment image sequences of at least one style, for a two-dimensional sample garment image sequence of each style in the two-dimensional sample garment image sequences of at least one style, performing: extracting feature points of the two-dimensional sample garment image sequence; constructing a fundamental matrix based on the extracted feature points; establishing a three-dimensional garment model based on the constructed fundamental matrix and calibration parameters of a pre-calibrated camera, wherein the camera is a camera acquiring the two-dimensional sample garment image sequence;

generating the set of three-dimensional garment models based on the established at least one three-dimensional garment model.

6. The method according to claim 1, wherein after the generating the three-dimensional garment image of the acquired two-dimensional garment image, the method further comprises:
receiving somatotype information;
selecting a virtual three-dimensional model matching the somatotype information from a preset virtual three-dimensional model set;
setting, based on a preset coordinate mapping relationship between the virtual three-dimensional model and the three-dimensional garment model, the three-dimensional garment image onto the selected virtual three-dimensional model and presenting.

7. An apparatus for processing an image, the apparatus comprising:
at least one processor; and
a memory storing instructions, the instructions when executed by the at least one processor, causing the at least one processor to perform operations, the operations comprising:
acquiring a two-dimensional garment image, wherein the two-dimensional garment image includes a style identifier of a garment;
selecting a three-dimensional garment model matching the style identifier from a pre-established set of three-dimensional garment models, wherein the three-dimensional garment model includes scatter points labeled thereon;
labeling the two-dimensional garment image with scatter points based on a pre-established coordinate mapping relationship between the two-dimensional garment image and the three-dimensional garment model and the scatter points of the selected three-dimensional garment model;
performing coordinate transformation on the scatter points of the acquired two-dimensional garment image, and determining coordinate information of the scatter points after the coordinate transformation;
generating a primitive having a preset shape based on the coordinate information of the scatter points after the coordinate transformation, the primitive comprising a preset number of scatter points after the coordinate transformation and a connection relationship between the scatter points;
rasterizing the primitive to obtain a fragment set of the primitive, wherein a fragment in the fragment set includes a color value and texture coordinate information; and
performing texture coordinate mapping on the fragment set to obtain pixels of the selected three-dimensional garment model;
generating the three-dimensional garment image based on the obtained pixels.

8. The apparatus according to claim 7, wherein
the connection relationship comprises a number of other scatter points connected to each scatter point, and relative coordinate information between the other scatter points connected to each scatter point and the each scatter point.

9. The apparatus according to claim 8, wherein the fragment in the fragment set further comprise texture material information; and
the generating the three-dimensional garment image based on the obtained pixels is further configured to:

determining illumination information of the obtained pixels based on the texture material information and the preset light source coordinate information;
processing the obtained pixels based on light source color information and the determined illumination information;
generating the three-dimensional garment image based on the processed pixels.

10. The apparatus according to claim 8, wherein the operations further comprise:
smoothing texture of the three-dimensional garment image.

11. The apparatus according to claim 7, wherein the set of three-dimensional garment models is established by:
acquiring a set of two-dimensional sample garment images, the set of two-dimensional sample garment images including two-dimensional sample garment image sequences of at least one style, for a two-dimensional sample garment image sequence of each style in the two-dimensional sample garment image sequences of at least one style, performing: extracting feature points of the two-dimensional sample garment image sequence; constructing a fundamental matrix based on the extracted feature points; establishing a three-dimensional garment model based on the constructed fundamental matrix and calibration parameters of a pre-calibrated camera, wherein the camera is a camera acquiring the two-dimensional sample garment image sequence;
generating the set of three-dimensional garment models based on the established at least one three-dimensional garment model.

12. The apparatus according to claim 7, wherein the operations further comprise:
receiving somatotype information;
selecting a virtual three-dimensional model matching the somatotype information from a preset virtual three-dimensional model set;
setting, based on a preset coordinate mapping relationship between the virtual three-dimensional model and the three-dimensional garment model, the three-dimensional garment image onto the selected virtual three-dimensional model and presenting.

13. A non-transitory computer readable storage medium, storing a computer program thereon, wherein the program, when executed by a processor, implements operations, the operations comprise:
acquiring a two-dimensional garment image, wherein the two-dimensional garment image includes a style identifier of a garment;
selecting a three-dimensional garment model matching the style identifier from a pre-established set of three-dimensional garment models, wherein the three-dimensional garment model includes scatter points labeled thereon;
labeling the two-dimensional garment image with scatter points based on a pre-established coordinate mapping relationship between the two-dimensional garment image and the three-dimensional garment model and the scatter points of the selected three-dimensional garment model;
performing coordinate transformation on the scatter points of the acquired two-dimensional garment image, and determining coordinate information of the scatter points after the coordinate transformation;
generating a primitive having a preset shape based on the coordinate information of the scatter points after the coordinate transformation, the primitive comprising a preset number of scatter points after the coordinate transformation and a connection relationship between the scatter points;
rasterizing the primitive to obtain a fragment set of the primitive, wherein a fragment in the fragment set includes a color value and texture coordinate information;
performing texture coordinate mapping on the fragment set to obtain pixels of the selected three-dimensional garment model; and
generating the three-dimensional garment image based on the obtained pixels.

14. The medium according to claim 13, wherein the connection relationship comprises a number of other scatter points connected to each scatter point, and relative coordinate information between the other scatter points connected to each scatter point and the each scatter point.

15. The medium according to claim 14, wherein the fragment in the fragment set further comprise texture material information; and
the generating the three-dimensional garment image based on the obtained pixels comprises:
determining illumination information of the obtained pixels based on the texture material information and the preset light source coordinate information;
processing the obtained pixels based on light source color information and the determined illumination information;
generating the three-dimensional garment image based on the processed pixels.

16. The medium according to claim 14, wherein after the generating the three-dimensional garment image based on the obtained pixels, the method further comprises:
smoothing texture of the three-dimensional garment image.

17. The medium according to claim 13, wherein the set of three-dimensional garment models is established by:
acquiring a set of two-dimensional sample garment images, the set of two-dimensional sample garment images including two-dimensional sample garment image sequences of at least one style, for a two-dimensional sample garment image sequence of each style in the two-dimensional sample garment image sequences of at least one style, performing: extracting feature points of the two-dimensional sample garment image sequence; constructing a fundamental matrix based on the extracted feature points; establishing a three-dimensional garment model based on the constructed fundamental matrix and calibration parameters of a pre-calibrated camera, wherein the camera is a camera acquiring the two-dimensional sample garment image sequence;
generating the set of three-dimensional garment models based on the established at least one three-dimensional garment model.

18. The medium according to claim 13, wherein after the generating the three-dimensional garment image of the acquired two-dimensional garment image, the method further comprises:
receiving somatotype information;
selecting a virtual three-dimensional model matching the somatotype information from a preset virtual three-dimensional model set;
setting, based on a preset coordinate mapping relationship between the virtual three-dimensional model and the three-dimensional garment model, the three-dimensional garment image onto the selected virtual three-dimensional model and presenting.

\* \* \* \* \*